(12) United States Patent
Park

(10) Patent No.: US 6,970,436 B2
(45) Date of Patent: Nov. 29, 2005

(54) APPARATUS FOR MONITORING ASYNCHRONOUS TRANSFER MODE CELLS IN COMMUNICATION SYSTEMS

(75) Inventor: Jae Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 09/847,347

(22) Filed: May 3, 2001

(65) Prior Publication Data

US 2002/0165010 A1 Nov. 7, 2002

(51) Int. Cl.[7] .............................................. H04B 7/00
(52) U.S. Cl. .................. 370/310.1; 370/252; 370/253; 370/310.2; 370/340; 370/341; 370/395.1; 370/395.5; 370/397; 370/399; 714/48; 714/54; 714/704; 714/705; 714/706; 714/798
(58) Field of Search ................................. 370/252, 253, 370/310.1, 310.2, 340, 341, 395.1, 395.5, 370/397, 399; 714/704, 705, 706, 798, 48, 714/54

(56) References Cited

U.S. PATENT DOCUMENTS

| | | | |
|---|---|---|---|
| 5,655,071 A * | 8/1997 | Habbe et al. ................. 714/25 |
| 5,729,536 A * | 3/1998 | Doshi et al. ................. 370/398 |
| 6,009,086 A * | 12/1999 | Freeburg et al. ......... 370/310.2 |
| 6,445,683 B1 * | 9/2002 | Nobuyasu et al. ....... 370/310.1 |
| 6,477,154 B1 * | 11/2002 | Cheong et al. ............. 370/328 |
| 6,512,747 B1 * | 1/2003 | Umeuchi et al. ........ 370/310.1 |
| 6,570,856 B1 * | 5/2003 | Freeburg et al. ......... 370/310.1 |
| 6,591,150 B1 * | 7/2003 | Shirota ........................ 700/82 |
| 6,678,256 B1 * | 1/2004 | Sato ........................ 370/310.1 |
| 6,721,336 B1 * | 4/2004 | Witel et al. ................. 370/474 |

OTHER PUBLICATIONS

Mitsuru Seta, Time Synchonization Method in CDMA System, Filing Date (Jan. 25, 1999), US 2002/0054611.*
Chae-Moon Lee, Base Station Controller in IMT-2000 System, Filing Date (Jan. 2, 2001), US 2001/0006516.*

* cited by examiner

Primary Examiner—Wellington Chin
Assistant Examiner—Kevin Mew
(74) Attorney, Agent, or Firm—Fleshner & Kim, LLP

(57) ABSTRACT

An apparatus for monitoring asynchronous transfer mode cells in the communication system is proper for recognizing state information of asynchronous transfer mode cells transceiving between a base transceiver station and a base station controller. Accordingly, the apparatus enables to monitor the contents of the cell by comparing VPI/VCI of the ATM cells inputted to the multiplexing/demultiplexing part to the other VPI/VCI latched hardware, have the cell bus RX I/F count the number of the error-occurring ATM cells by carrying out header error checks of the ATM cells inputted to the cell bus RX I/F itself, and find out how long the cell transferring time takes for transceiving loop is found out by transceiving the test ATM cells between the multiplexing/demultiplexing part being the ATM low rate subscriber multiplexing/demultiplexing board assembly (ALMA) and the base transceiver station.

23 Claims, 2 Drawing Sheets

APPARATUS FOR MONITORING ASYNCHRONOUS TRANSFER MODE CELLS IN COMMUNICATION SYSTEMS

BACKGROUND OF THE INVENTION

1. Field of the Invention

The present invention relates to an asynchronous transfer mode (hereinafter abbreviated ATM) cell monitoring, more particularly, to an asynchronous transfer mode cell monitoring method in communication Systems and a system thereof which enable to monitor ATM cells which are being transceived (transmitted/received) between a base transceiver system and a base station controller by specific VPI/VCI, errors of ATM cells, and transmission time of the ATM cells.

2. Background of the Related Art

ATM, which is developed from the packet exchange principle, enables to perform high speed operation as fast as circuit switching does by simplifying a method of processing packets which are being transmitted.

Digital information generated from the ATM is split into blocks each of which has constant length. And, the split blocks to which headers of 5 bytes including receiving numbers respectively are transferred. Other blocks similar to the packets are called cells in ATM.

In a network system, the corresponding cell is transferred to the opposite party by finding an address of the destination included in the header by cell unit. In a transfer path, the cells arrived from a plurality of terminals are multiplexed in order of arrival sequence and then transferred to the destinations. It is known immediately that the header information of the cell is transferred from a specific terminal, thereby enabling to make a distinction from the multiplex transfer.

As all the cells are transferred after the division, it is not necessary for a physical line to be occupied by one communication. Namely, it is desirable in the efficiency of using a line that ATM cells are transferred through the single line by being multiplexed. It looks like by the transmitting party that a dedicated line is provided for the cells to reach the opposite party by cell transmission through various lines. Such a line called virtual channel (VC). A number that is called virtual channel identifier (VCI) is designated to the virtual channel.

A single virtual channel is established between one terminal and the other terminal, while a plurality of virtual channels are established between sub systems in a telecommunication network. In such intervals, some of the virtual channels are bound together according to the virtual channel identifier each and then a pack of the bound channels is transmitted to the destined terminal. Such a pack of several bound channels together is called a path.

In ATM, the virtual channels are bound by the VCI, whereby the path is so-called a virtual path having a virtual path identifier(VPI).

FIG. 1 shows a block diagram of an ATM cell monitoring device in an ATM low rate subscriber multiplexing/demultiplexing part of a base station controller according to a related art Referring to FIG. 1, a mobile telecommunication system comprises a base transceiver station 10, a base station controller 20 controlling the base transceiver station, a mobile switching center 30 constituting an interface point for a user traffic between switching centers.

In an ATM cell monitoring device of an ATM low rate subscriber multiplexing/demultiplexing part in a base station controller according to a related art, as shown in FIG. 1, the base transceiver station 10 and the ATM low rate physical layer board assembly (ALPA) 1 are connected each other via 'E1'.

And, an ATM low rate subscriber multiplexing/demultiplexing board assembly 2 functions as an interface between an ATM switch in the base station controller 20 and the base transceiver station 10 for data transceiving, thereby multiplexing and demultiplexing an ATM cell.

Moreover, the ATM low rate subscriber multiplexing/demultiplexing board assembly 2 transmits an ATM cell to an ATM switch in the base station controller 20 and makes an SOC (start of cell) signal of the ATM cell become low active whenever transmitting a first byte of the ATM cell of 53 bytes, thereby storing the number in a dual port RAM (DPRAM) whenever the SOC signal becomes active. The location written in the dual port RAM is distinguished by indexing with VPI/VCI, which is read by a CPU of the ATM low rate subscriber multiplexing/demultiplexing board assembly 2 to ascertain how many cells have passed through by the corresponding VPI/VCI.

In accordance with the number of storage in the dual port RAM, as mentioned in the above explanation, the number of the ATM cells inputted in the base station controller and the other number of the ATM cells outputted from the base station controller are monitored. Unfortunately, the ATM cell monitoring device according to the related art only monitors how many ATM cells are transmitted and received when transceiving an ATM cell consisting of 53 bytes yet fails to monitor an error of the transceiving ATM cell and a delay time of the cell transmission from the base station controller to the base transceiver station.

SUMMARY OF THE INVENTION

Accordingly, the present invention is directed to an asynchronous transfer mode cell monitoring method in communication systems and a system thereof that substantially obviate one or more of the problems due to limitations and disadvantages of the related art.

The object of the present invention is to provide an asynchronous transfer mode cell monitoring device in communication systems enabling to monitor an ATM cell error or transmission time when monitoring transceiving ATM cells.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention in a communication system including a base transceiver station and a base station controller controlling the base transceiver station includes: a receive interface part established in the base station controller, the receive interface part recording a cell to be monitored in a storage part by checking latched VPI/VCI of asynchronous transfer mode cells received from the base transceiver station by the base station controller, the receive interface part counting the number of error occurrence by checking header errors of the cells; and a transmission interface part established in the base station controller, the transmission interface part transferring a test cell produced for checking a cell transmission time between the base transceiver station and the base station controller to the base transceiver station.

According to the present invention, it is able to monitor an information, a rate of error occurrence and transmission time of the ATM cell transceiving between base transceiver stations, It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the Drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
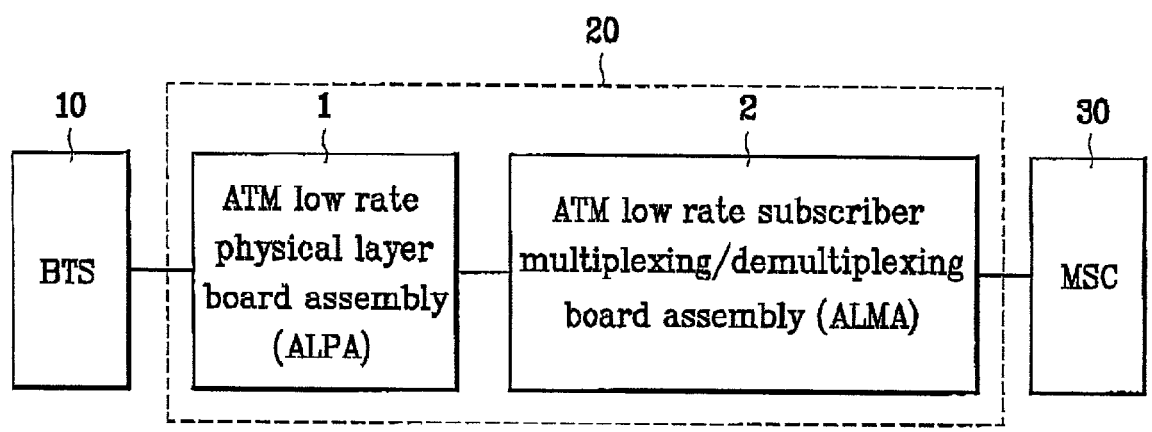
FIG. 1 shows a block diagram of an ATM cell monitoring device in an ATM low rate subscriber multiplexing/demultiplexing part of a base station controller according to a related art.
Figure 2:
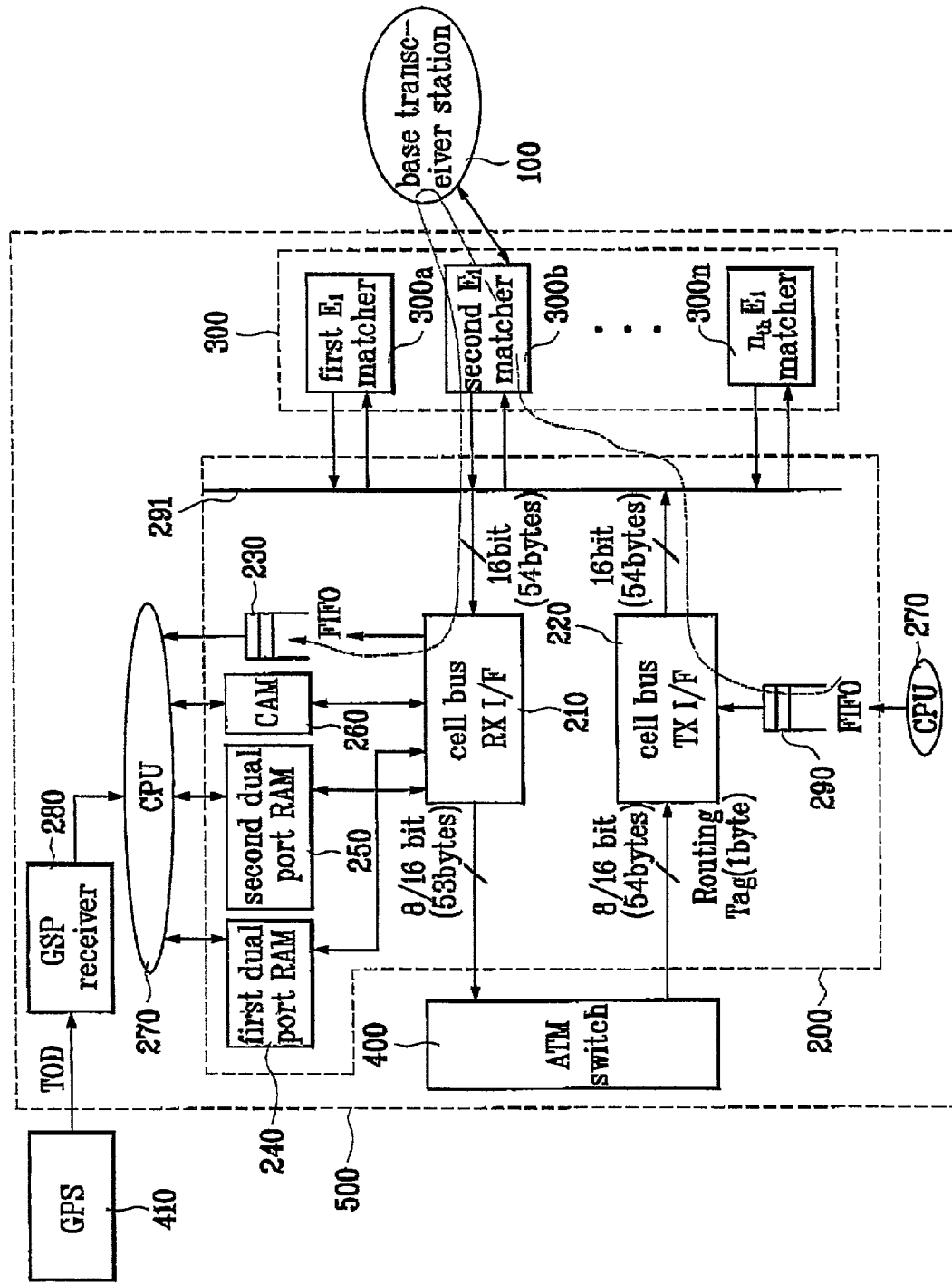
FIG. 2 shows a block diagram of an asynchronous transfer mode cell monitoring device in a telecommunication system according to the present invention.

FIG. 2 shows a block diagram of an asynchronous transfer mode cell monitoring device in a telecommunication system according to the present invention.

Referring to FIG. 2, an ATM cell monitoring device 500 of a cell multiplexing/demultiplexing device in a base station controller of a communication system includes an E1 matching part 300 consisting of a first to an nth E1 matcher 300a to 300n and enabling to perform E1 interface (2.048 Mbps) by being connected to a base transceiver station 100, a multiplexing/demultiplexing part 200 (established in a base station controller) multiplexing and transmitting an ATM cell inputted from the E1 matching part 300 to an ATM switch 400 and then demultiplexing the ATM cell inputted from the ATM switch 400, a CPU 270 controlling the multiplexing/demultiplexing part 200, a GPS receiver 280 receiving a packet, an ATM switch 400 switching outputting ATM cells transceiving with the multiplexing/demultiplexing part 200.

And, the TOD information therein is transferred to the multiplexing/demultiplexing part 200 through the CPU 270.

The multiplexing/demultiplexing part 200 comprises a cell bus 291 through which ATM cells pass, a cell bus RXI/F 210 which multiplexes the ATM cells inputted from the first to nth matches 300a to 300n, adjusts the inputted ATM cells for the ATM cell requirements for the multiplexing/demultiplexing part 200 itself, carries out header error check (HEC) of the ATM cells, counts and records the number of error occurred in a first dual port RAM 240, a cell BUS TX I/F 220 transferring an ATM cell received from the ATM switch 400 or a test ATM cell to the E1 matching part 300 wherein the test ATM cell is generated from the CPU 270 for measurement of cell transmission time, a first dual port RAM 240 storing the number of ATM cells inputted into the multiplexing/demultiplexing part 200 and the other number of the error-occurred ATM cells of the inputted ATM cells which are provided by the cell bus RX I/F 210, a second dual port RAM 250 in which VPI index matched by each of the VPI/VCI is stored, a CAM (content addressable memory) 260 in which an address of the second dual port RAM 250 where the VPI index is stored, a first FIFO (first in first out) 230 storing temporarily the ATM cells received from the E1 matching part 300 wherein the ATM cells are to be read by the CPU 270, and a second FIFO (290) storing temporarily the test ATM cells generated from the CPU 270.

The ATM cell Monitoring device in a communication system of the above-described structure according to the present invention may be mainly divided into three parts.

First, the CPU 270 monitors information of the cell to be monitored by comparing VPI/VCI of the ATM cells inputted to the multiplexing/demultiplexing part 200 to the other VPI/VCI latched by hardware.

Second, the cell bus RX I/F 210 counts the number of the error-occurring ATM cells by carrying out header error checks of the ATM cells inputted to the cell bus RX/ I/F 210 itself.

Third, how long the cell transferring time takes for transceiving loop is found out by transceiving the test ATM cells between the multiplexing/demultiplexing part 200 being the ATM low rate subscriber multiplexing/demultiplexing board assembly (ALMA) and the base transceiver station 100.

First of all, it is established to monitor the ATM cells consisting of 53 bytes each so that the value of 24 bits of the VPI/VCI field is latched with hardware wherein VPI and VCI is of 8 bits and 16 bits respectively at the user network interface.

When the ATM cells to be monitored selectively exists by comparing the VPI/VCI of the ATM cells inputted to the cell bus RX I/F 210 to the other VPI/VCI latched with hardware, the CPU 270 directs the first FIFO 230 to store it when the cell bus RX I/F 210 receives the ATM cells having the VPI/VCI field. In accordance with the direction, one the ATM cell to be monitored out of the whole ATM cells received by the base transceiver station 100 is received by the cell BUS RX I/F 210 and then recorded in the first FIFO 230, the CPU 270 checks the error occurrence through the entire cells by monitoring the recorded ATM cell of 53 bytes.

Then, the header error check of the ATM cell inputted from a cell bus 291 is carried out by the cell bus RX I/F 210. And, the cell bus RX I/F 210 transmits the cell transferred from the base transceiver station 100 to the ATM switch 400 as soon as stores the number of the error-occurring ATM cells and the other number of the ATM cells inputted to the multiplexing/demultiplexing part 200 in the first dual port RAM 240. Said cell bus RX I/F 210 is realized by a field programmable logic gate array(FPGA).

In this case, when the VPI/VCI of the ATM cell inputted to the multiplexing/demultiplexing part 200 is matched with a reference value of the CAM 260, said CAM 260 outputs a data to be used as an address of the second dual port RAM 250. And, said VPI/VCI has a value latched with hardware.

Storing the VPI index values by each VPI/VCI, the second dual port RAM 250 outputs a VPI index corresponding to the latched VPI/VCI. The VPI index values by each VPI/VCI which are outputted from the second dual port RAM 250 are used for addresses in the first dual port RAM 240, thereby determining where the number of the error-occurring ATM cells and the other number of the ATM cells inputted into the multiplexing/demultiplexing part 200 will be recoded therein.

In this case, the data of the CAM 260 and the second dual port Ram 250 are recorded when electric power is inputted to the CPU 270 with software and may be adjusted occasionally on operation. Loop time of the ATM cell transceiving between the base station controller and the base transceiver station 100 is checked in a manner as follows.

The CPU 270 generates a test cell in the second FIFO 290. And, when the generated test cell is transmitted to the base transceiver station 100 and then loop-backed to the cell bus RX I/F 210 of the base station controller, the GPS receiver 280 puts the TOD information at the time when transferred from the cell bus TX I/F 220 to the base transceiver station 100 and the time information at the time that the cell is received by the cell bus RX I/F 210 from the base transceiver station 100 in the test ATM cell. In this case, the time information is transmitted from the GPS 410.

Therefore, one the cell loop-backed from the base transceiver station 100 arrives in the cell multiplexing/demultiplexing part device and is stored in the first FIFO 230 by being received from the cell bus RX I/F 210, the CPU 270 enables to monitor the loop time (cell transmission delay time) by each VPI/VCI by comparing the transmission and receive times with each other.

Namely, the VPI/VCI of the test cell is recognized as a cell to be monitored by the cell bus RX I/F and then stored in the first FIFO 230, whereby the CPU 270 checks the transceiving time of the test cell.

As mentioned in the above explanation, the apparatus for monitoring asynchronous transfer mode cells in communication systems according to the present invention has the effects as follows.

First, it is able to monitor the required contents of the ATM cell of 53 bytes being transceived between the base transceiver station and the base station controller.

Second, it is able to monitor an error rate of the ATM cells being transceived the base transceiver station and the base station controller.

Third, it is able to monitor the transmission(delay) time of the ATM cells the base transceiver station and the base station controller.

It will be apparent to those skilled in the art that various modifications and variations can be made in an apparatus for monitoring asynchronous transfer mode cells in communication systems of the present invention without departing from the spirit or scope of the inventions. Thus, it is intended that the present invention cover the modifications and variations of this invention provided they come within the scope of the appended claims and equivalents.

What is claimed is:

1. In a communication system including a base transceiver station and a base station controller controlling the base transceiver station, an apparatus for monitoring asynchronous transfer mode cells in a communication system comprising:
a receive interface part established in the base station controller, the receive interface part recording a cell to be monitored in a storage part by checking latched VPI/VCI of asynchronous transfer mode cells received from the base transceiver station by the base station controller, the receive interface part counting and recording a number of error occurrences by checking header errors of the cells; and
a transmission interface part established in the base station controller, the transmission interface part transferring a test cell produced for checking a cell transmission time between the base transceiver station and the base station controller,
wherein the receive interface part includes:
a first storage part storing the cell to be monitored temporarily;
a second storage part outputting a data corresponding to the latched VPI/VCI of the cell;
a third storage part outputting a VPI index value of an address designated by the data outputted from the second storage part; and
a fourth storage part storing the number of error occurrence of the cell at the other address designated by the VPI index value.

2. The apparatus of claim 1, wherein the third and fourth storage parts are RAMs having dual ports.

3. The apparatus of claim 1, wherein the first storage part outputs a previously-stored cell in advance.

4. The apparatus of claim 1, wherein the second storage part outputs a data when there exists a matched VPI/VCI by comparing the VPI/VCI of the cell to a reference value.

5. The apparatus of claim 1, wherein the test cell is stored in the first storage part by being transferred from the base transceiver station to the base station controller.

6. The apparatus of claim 1, further comprising:
a GPS receiver receiving a time information packet from GPS, the GPS receiver providing the receive and transmission parts with the time information packet; and
a controller producing the test cell including a time information provided by the GPS receiver or checking a cell transmission delay time by comparing transceiving time of a cell loop-backed from the base transceiver station.

7. The apparatus of claim 6, wherein the receive and transmission parts are provided with the time information with which the respective interface parts are provided when the test cell is transceived from/to the base station controller to/from the base transceiver station.

8. The apparatus of claim 1, wherein the VPI/VCI is latched with hardware.

9. The apparatus of claim 1, wherein the base transceiver station and the base station controller are interfaced by E1.

10. The apparatus of claim 1, wherein the transmission and receive interface parts are established in a function part multiplexing/demultiplexing a cell inputted from an asynchronous transfer mode cell switch included in the base transceiver station or the base station controller.

11. A method of monitoring cells in a communication system, comprising:
recording a cell to be monitored by checking identifiers of cells received from a base transceiver station by a base station controller;
counting and recording a number of error occurrences by checking header errors of cells;
transferring a cell to the base transceiver station to check a cell transmission time between the base transceiver station and the base station controller;
outputting a virtual path identifier index value of an address designated by outputted data corresponding to a latched VPI/VCI of a cell; and
storing the number of error occurrences of the cell at the address designated by the virtual path identifier index value.

12. The method of claim 11, further comprising:
temporarily storing the cell to be monitored; and
outputting a data corresponding to the identifier of the cell.

13. The method of claim 11, further comprising outputting a previously-stored cell in advance.

14. The method of claim 11, further comprising outputting a data when there exists a matched identifier by comparing the identifier of the cell to a reference value.

15. The method of claim 11, further comprising storing said transferred cell by transferring from the base transceiver station to the base station controller.

16. The method of claim 11, wherein the identifiers are matched identifiers.

17. The method of claim 11, further comprising:
receiving time information from a global positioning system;
producing said transferred cell by including said received time information; and
checking a cell transmission delay time by comparing transceiving time of said transferred cell loop-backed from the base transceiver station.

18. The method of claim 11, further comprising interfacing said base transceiver station and said base station controller by E1.

19. The method of claim 11, wherein said cells are asynchronous transfer mode cells.

20. The method of claim 11, wherein said latched identifiers are virtual path/channel identifiers.

21. The method of claim 11, wherein said transferred cell is a test cell.

22. The method of claim 11, wherein said transferred cell includes time of date information.

23. In a communication system including a base transceiver station and a base station controller, an apparatus for monitoring cells in a communication system comprising:

a receive interface part established in the base station controller, the receive interface part recording a cell to be monitored in a storage part by checking latched identifiers of cells received from the base transceiver station by the base station controller, the receive interface part counting and storing a number of error occurrences by checking header errors of the cells; and a transmission interface part established in the base station controller, the transmission interface part transferring a cell to the base transceiver station to check a cell transmission time between the base transceiver station and the base station controller, wherein the receive interface part includes:

a first storage part storing the cell to be monitored temporarily;

a second storage part outputting a data corresponding to the latched VPI/VCI of the cell;

a third storage part outputting a VPI index value of an address designated by the data outputted from the second storage part; and a fourth storage part storing the number of error occurrence of the cell at the other address designated by the VPI index value.

* * * * *